United States Patent [19]

Kaufmann

[11] Patent Number: 4,546,511
[45] Date of Patent: Oct. 15, 1985

[54] CONTINUOUS FLOW LAUNDRY SYSTEM AND METHOD

[76] Inventor: Richard O. Kaufmann, 6050 W. El Camino del Cerro, Tucson, Ariz. 85745

[21] Appl. No.: 630,980

[22] Filed: Jul. 16, 1984

[51] Int. Cl.⁴ .................. D06F 31/00; D06F 39/08
[52] U.S. Cl. ................................. 8/158; 68/27; 68/207; 134/107
[58] Field of Search ............. 8/158, 159; 68/15, 16, 68/27, 58, 207; 134/107, 108

[56] References Cited

U.S. PATENT DOCUMENTS

| | | | |
|---|---|---|---|
| 1,945,477 | 1/1934 | Cimarik et al. | 68/58 X |
| 2,645,914 | 7/1953 | Sessions | 68/58 X |
| 2,785,694 | 3/1957 | Walde | 134/107 X |
| 4,326,551 | 4/1982 | Voorhees | 134/107 X |
| 4,386,509 | 6/1983 | Kuttelwesch | 68/207 X |

FOREIGN PATENT DOCUMENTS

| | | | |
|---|---|---|---|
| 712150 | 10/1941 | Fed. Rep. of Germany | 134/107 |
| 820385 | 9/1959 | United Kingdom | 68/27 |
| 364708 | 3/1973 | U.S.S.R. | 68/27 |

Primary Examiner—Philip R. Coe
Attorney, Agent, or Firm—Cahill, Sutton & Thomas

[57] ABSTRACT

A continuous flow laundry system and method incorporates a fluid flow control, temperature control, and heat recovery systems. Steam is injected into the system to derive appropriate temperatures for washing laundry; rinse water is provided at a predetermined elevated temperature by passing fresh water through a heat exchanger to derive heat from designated outflows of the system. As soiled laundry enters the system to flow counter to the washing fluid flow, it is subjected to a flushing section provided with flush water at a reduced elevated temperature; the laundry is then passed through a washing section where it is subjected to water at an elevated temperature for the washing cycle. The washed laundry is passed to a rinse section and subsequently to an extractor section for removal of excess water therefrom. Outflow rinse water is combined with water from the extractor and supplied to the heat exchanger; a portion of this combined outflow is shunted around the heat exchanger to be mixed with the outflow passing through the heat exchanger to control the temperature of the water supplied to the flush section. Outflow from the wash and flush sections is combined and supplied to the heat exchanger for extraction of heat therefrom to elevate the temperature of the fresh water in the heat exchanger to be supplied to the rinse section.

9 Claims, 1 Drawing Figure

CONTINUOUS FLOW LAUNDRY SYSTEM AND METHOD

BACKGROUND

The present invention relates to methods and apparatus for use in a continuous flow commercial laundry, and more particularly, to a continuous flow laundry incorporating a heat recovery system.

Continuous flow commercial laundry systems provide numerous advantages over other types of commercial laundry systems. The continuous flow system incorporates a cylinder or drum mounted for rotation about a substantially horizontal axis and containing separate compartments. The compartments are formed by baffles that may be constructed in the manner of an Archimedes screw. Dry laundry enters through one end of the horizontal drum and travels the length of the drum by virtue of the rotation of the drum with the laundry following the path defined by the baffles. Individual batches of laundry are maintained separate in the drum by the baffles. Hot water and appropriate chemicals are introduced into the system and are caused to flow in a direction contrary to the flow of the laundry.

Such continuous flow laundry systems are usually large in comparison to individual batch processing type installations. However, thermal efficiency of such larger installations therefore becomes even more important in view of the substantial amounts of heat loss to which the system is susceptible. Power requirements for heating water is therefore an important and significant portion of the operating cost of the continuous flow system particularly in view of energy costs and the likely increase in such costs in years to come.

OBJECT OF THE INVENTION

It is therefore an object of the present invention to provide a method and apparatus for the continuous processing of laundry while maximizing the efficiency of operation.

It is another object of the present invention to provide a method and apparatus for extracting heat from predetermined outflow fluid from the continuous flow laundry system and transferring such heat to input fluids being supplied to the system.

It is still another object of the present invention to provide a continuous flow laundry system incorporating heat exchangers for transferring heat from selected outflow to fresh water being supplied to the system.

It is still another object of the present invention to provide a method and apparatus for increasing the thermal efficiency of the continuous flow laundry system by extracting heat from fluids in the system at selected locations to supply such heat through heat exchangers to input fluids being supplied to the system.

SUMMARY OF THE INVENTION

Briefly, in accordance with the embodiment chosen for illustration, the present apparatus and method incorporates heat exchangers for receiving combined fluid from the rinse section of the laundry and from the extractor section; the water is passed through heat exchangers in heat exchange relation with incoming fresh water being supplied to the system at the rinse section. Outflow from the flush section and the wash section of the system is combined and supplied to the heat exchanger for heat exchange to the fresh water to thereby extract heat from the waste water exiting the system.

Water supplied to the system at the flush section is derived from a combination of the outflow water from the rinse section and the extractor section of the system which divided into a first portion to be delivered to the flush section through a heat exchanger and a second portion that is shunted around the heat exchanger; the two portions are combined to provide a predetermined temperature for use in the flush section.

BRIEF DESCRIPTION OF DRAWING

The present invention may more readily be described by reference to the accompanying drawing which shows a schematic diagram of a continuous flow laundry system constructed in accordance with the teachings of the present invention.

DETAIL DESCRIPTION OF THE DRAWING

Figure 1:
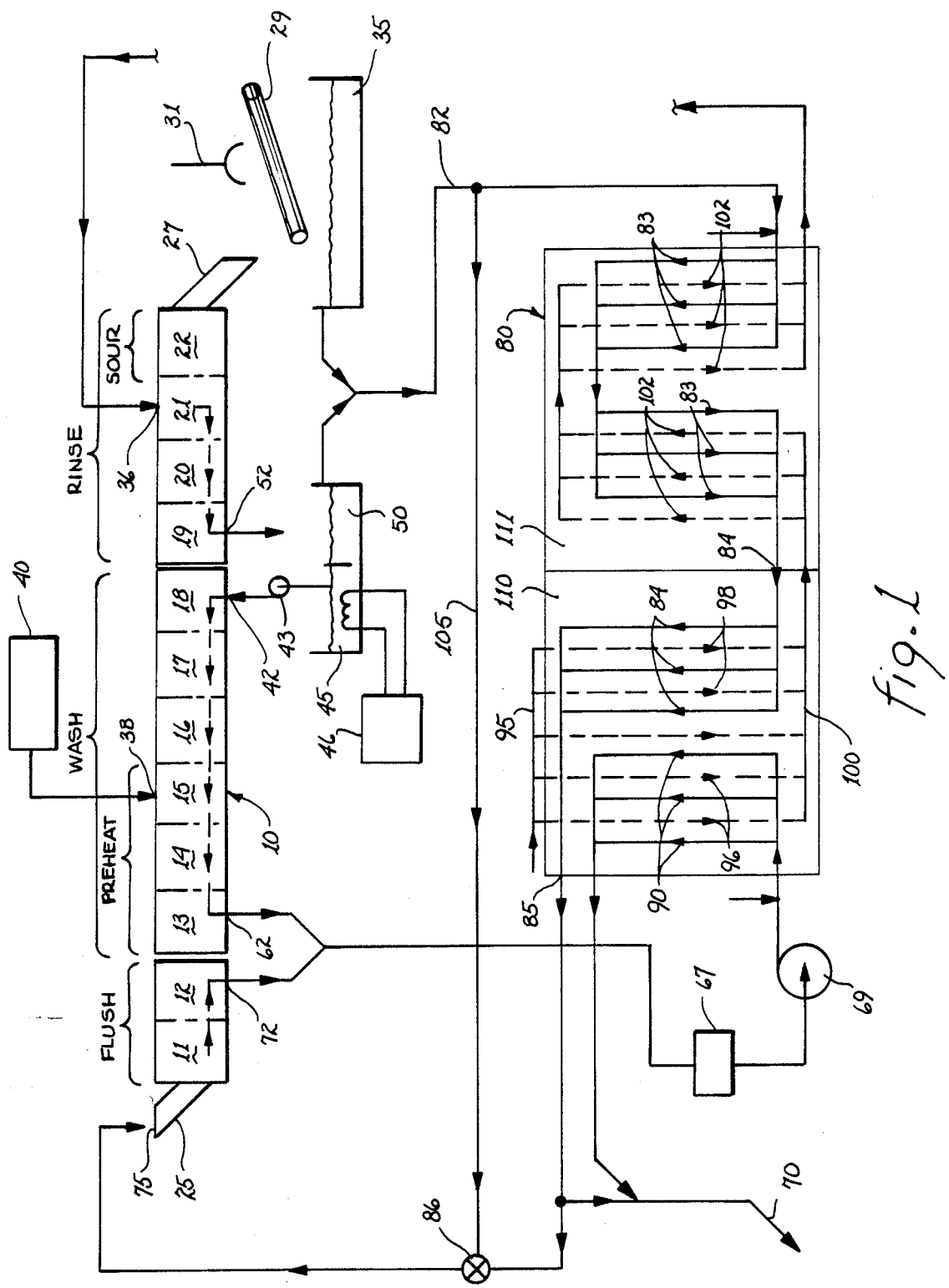

Referring now to the drawing, a rotating cylindrical drum 10 is provided with plurality of compartments 11 through 22 each of which is separated from adjacent compartments by baffles formed into an Archimedes screw. Continuous flow laundry systems incorporating such cylindrical drum structures are commonly referred to in the trade as "tunnel systems" or "tunnel washers", are well known in the industry and are available from a variety of manufacturers. The compartments 11 through 22 may be divided into groups according to the function performed therein. Typically, the system is divided into a flush section (compartments 11 and 12), a wash section (compartments 13 through 18), a rinse section (compartments 19 through 22) and an extraction section 31. In addition, these sections may be sub-divided such as shown in the drawing wherein it may be seen that compartments 13,14 and 15 may also be designated a preheat sub-section while compartment 22 may be designated a sour sub-section. Dry laundry enters the system through the chute 25 and proceeds from left to right as shown in the drawing to chute 27. The laundry at 27 is clean but is saturated with excess water which must be removed. An extractor, shown schematically at 31, removes excess liquid which is then collected in reservoir 35. A conveyor 29 transports the laundry to a drying station (not shown) for removal of the remaining moisture.

Water used in the washing process traverses the cylinder 10 from right to left, or in counter flowing relationship to the laundry. Steam may be injected into the system such as at 38 from a steam source 40 while steam heated water may be introduced at 42 by means of pump 43 supplying heated water from reservoir 45. The water in the reservoir 45 is heated from steam source 46. The reservoir 45 is supplied with water from adjacent reservoir 50 which in turn receives outflow water from the drum at 52. The outflow at 52 comes from the rinse section at a relatively high temperature. The outflow from the rinse section at 52, and the water extracted by the extractor 31 and delivered to the reservoir 35, are combined and supplied to the flush section in a manner to be described.

Water in the wash section exits at 62 and is combined with the outflow from the flush section exiting at 72. The outflow from the flush and wash sections are combined and filtered in filter 67 and subsequently delivered by pump 69 through a heat exchanger (to be described) to the drain 70. Dry laundry entering the chute 25 is saturated and soaked by incoming water delivered at 75 at a controlled temperature. The laundry entering the system is thus subjected to a "pre-wash" in the flush section at a relatively low temperature (usually approximately 100° F.) to remove stains that may otherwise set if the temperature of the water were higher. The laundry is transferred from the flush section to the preheat section, the water temperature is elevated and reaches the maximum at compartment 16 where the injection of steam at 38 and high temperature water at 42 maintains the temperature at some optimum washing temperature (usually in the neighborhood of 180° F.). Again, it may be noted that the water flowing in the wash section is contrary to the flow of the laundry such that the dirtiest wash water acts upon the most soiled laundry and the freshest water acts upon the less soiled laundry. Upon completion of the washing phase as the laundry traverses the drum 10, the laundry passes to compartments 19 through 22 where it is rinsed with hot rinse water being introduced at 36. The sour sub-section is characteristically provided for the introduction of pH correcting agents to neutralize any bleach that may remain in the laundry. Bleach residues, if not removed, typically cause yellowing of the laundry when subjected to heating that may occur in the drying cycle or subsequent pressing.

Various detergents and related chemicals may be injected into the drum 10 at various locations in accordance with well known principles and techniques. The choice of chemicals will depend on a variety of factors including the nature and quality of the water available at the laundry, the typical type of laundry material being encountered including the expected soiled condition of the typical laundry load.

The overflow from the reservoirs 35 and 50 are combined and are supplied to a heat exchanger 80. The heat exchanger 80 comprises a plate and frame heat exchanger formed from a plurality of plates having ribbed surfaces that form channels between adjacent plates. Other types of heat exchangers may be used but it has been found that greater efficiency and space savings may be achieved by using such plate and frame devices. The heat exchanger 80 may be formed of a sectioned single heat exchanger or multipleheat exchangers interconnected to provide fluid flow in the manner shown. Thus as used herein, the terms "first", "second" or "third" when referring to heat exchangers, may be considered synonymous with corresponding sections of a single heat exchanger. The combined outflow from the rinse and extractor sections, collected in reservoirs 50 and 35 respectively, are thus conveyed through conduit 82 to the heat exchanger 80, and traverse the heat exchanger in the direction indicated by the arrows 83 and 84 to exit at 85 and be supplied to thermol regulating valve 86 with a portion of the water being delivered to the drain 70.

The outflow from the flush section and the wash section, exiting the cylinder 10 at 72 and 62 respectively, is combined and filtered in filter 67 and supplied by pump 69 to the heat exchanger 80. This waste water is directed through heat exchanger 80 as shown by the arrows 90 and is subsequently directed to the drain 70. Fresh water, such as from a municipal water supply, is supplied to the conduit 95 and is divided prior to entry into the heat exchanger 80 such that a portion thereof traverses heat exchanger in heat exchange relation with the outflow from the flush and wash sections, as indicated by the arrows 96, and another portion traverses the heat exchanger in heat exchange relation with the outflow from the rinse and extractor sections as indicated by the arrows 98. The two portions of fresh water thus derive heat while traversing the heat exchanger in parallel; the two portions are then combined and are directed by conduit 100 into heat exchange relation with the outflow from the rinse and extractor sections as indicated by the arrows 102. The incoming fresh water thus flows in parallel to extract heat from outflows from different sections of the laundry system and is then combined to flow in heat exchange relation with the higher temperature of the combined outflows of only the rinse and extractor sections. The parallel-serial flow of the fresh water through the heat exchanger permits the extraction of both low grade heat available from waste water at a relatively low temperature from the flush and wash sections as well as the extraction of high grade heat from the rinse and extractor sections.

A portion of the water from the rinse and extractor sections is delivered from the conduit 82 through conduit 105 to the thermal regulating valve 86. It may therefore be seen that the water traversing the conduit 105 is at relatively high temperature (the temperature of the combined outflow of rinse and extractor sections) while the temperature of the water delivered to the thermal regulating valve from the output port 85 of the heat exchanger 80 is at a substantially lower temperature (heat having been extracted therefrom during its traversing of the heat exchanger 80). The thermal regulator valve 86, a commercially available device, may be set to proportion water from conduit 105 and heat exchangers 80 so that the temperature of the water being delivered to the flush section is at a predetermined temperature and rate of flow. The excess water from the exit port 85, not required by the regulating valve 85, is delivered to the drain 70.

It may be seen that the heat exchanger 80 may be formed of one heat exchange apparatus, or alternatively, could be formed from two or more heat exchangers. For example, the heat exchanger 80 may be conveniently formed of two heat exchangers 110 and 111. Heat exchanger 110 receives fresh water that is directed to two separate sections of the exchanger in parallel; the first heat exchanger section receives heat from the outflow of the flush section and the wash section while the second heat exchange section receives heat from the rinse and extractor sections. The second heat exchanger 111 receives the heated fresh water from the first heat exchanger 110 and directs it into heat exchange relation with higher temperature outflow of the rinse and extractor sections.

As an example, the above described system may be shown having the following flow rates in gallons per minute and temperatures in degrees Fahrenheit:

Compartments 11 & 12: 100° F.
Compartment 13: 125° F.
Compartment 14: 136° F.
Compartment 15: 153° F.
Compartment 16, 17 & 18: 180° F.
Compartment 19: 166° F.
Compartment 20: 159° F.
Compartment 21: 155° F.
Compartment 22: 155° F.
water entering flush section: 30 GPM at 100° F.
water flowing to temperature control valve 86: 10.9 GPM at 161° F. on conduit 105; 19.1 GPM at 65° F. from heat exchanger water to drain: 37.5 GPM at 65° F.
combined outflow from flush and wash sections: 23 GPM at 114° F.; after passage through heat exchanger for delivery to rinse section: 40 GPM at 145° F.
outflow from rinse section (less portion supplied to wash section): 27 GPM at 166° F.
outflow from extractor: 17.6 GPM at 155° F.
combined outflow of rinse and extractor sections: 44 GPM at 161° F.
portion of combined outflow supplied to heat exchanger: 33.7 GPM at 161° F.
water supplied to wash section at 42: 13 GPM at 180° F.
heat requirements in form of steam: 15.8 BHP The present invention therefore extracts and combines waste water from the flush and wash sections and passes the waste water through the first of two heat exchangers, (or the first section of one heat exchanger). Water is also extracted and combined from the rinse and extraction sections and is passed through either a second section of the heat exchanger or through a second heat exchanger; fresh water to be supplied to the rinse section of the system is passed through the first heat exchanger in heat exchange relation with the waste water from the flush and wash sections. Fresh water is also passed through the second heat exchanger, (or second section of a single heat exchanger), and is mixed with fresh water from the first exchanger (or first section of the single heat exchanger). The mixed fresh water may then be passed through another heat exchanger to extract still further heat from the combined outflow of the rinse and extractor sections. The fresh water exiting the heat exchanger is then delivered to the rinse section. The method of delivering water from and to the various sections of the system, including the extraction of heat in the heat exchanger or exchangers, provides several advantages the most important of which is significant energy conservation. As indicated above in the example, the heat required for the operation in that example was 15.8 BHP. Using the same type of equipment and practising procedures under the prior art, the same overall water flow for processing the same laundry weight would require 26.4 BHP. It may therefore be seen that substantial savings are available through the system of the present invention.

Another significant advantage, and one that will also contribute to the overall efficiency of the laundry, is the fact that the present system provides a very high temperature for the rinse section which results in damp or wet wash being delivered to dryers at a significantly higher temperatures than is customarily found in prior art. Such higher temperatures of the wet wash results in substantially lower power consumption in the laundry drying process since less heat need be added to dry the wash. The system of the present invention also conveniently controls the temperature of the flush section to prevent setting of stains on laundry being introduced to the system. The outflow from the flush and wash sections has, in some prior art systems, generally been considered to be such low grade heat that its recovery was considered infeasible. In the system of the present invention, the extraction of such low grade heat is achieved by paralleling the incoming fresh water flow through a heat exchanger in heat relation with the waste water while simultaneously extracting heat from the rinse and extractor sections which have previously had high grade heat removed therefrom. The parallel extraction of this low grade heat contributes significantly to the overall thermal efficiency of the system.

I claim:

1. A continuous flow commercial laundry system comprising:
   a. a flush section for receiving laundry to be washed;
   b. a wash section for washing laundry received from said flush section;
   c. a rinse section for receiving washed laundry from said wash section;
   d. an extractor section for receiving laundry from said rinse section and for removing water therefrom;
   e. means for supplying flushing water at a predetermined temperature to said flush section;
   f. means for adding heat and water to said wash section to increase the temperature of the water and laundry therein during washing;
   g. means for collecting and combining water outflow from said flush and wash sections and directing said combined outflows through a first heat exchanger;
   h. means for collecting and combining water outflow from said rinse section and said extractor section and directing a portion of the combined outflows thereof through a second heat exchanger;
   i. means for supplying fresh water to be heated to said first and second heat exchangers and for directing heated fresh water from said heat exchangers to said rinse section.

2. The combination set forth in claim 1 including a third exchanger connected to receive fresh water from said first and second exchangers for directing heated fresh water from said third heat exchanger to said rinse section, said third heat exchanger connected to receive combined water outflow from said rinse section and said extractor section.

3. The combination set forth in claim 2 including proportioning means connected to directly receive a portion of the combined water outflow from said rinse section and extractor section, and to receive another portion of said combined outflow after it passes through said heat exchangers, said proportioning means combining said portions to provide water at a predetermined temperature to said flush section.

4. The combination set forth in claim 1 including proportioning means connected to directly receive a portion of the combined water outflow from said rinse section and extractor sections, and to receive another portion of said combined outflow after it passes through said second heat exchanger, said proportioning means combining said portions to provide water at a predetermined temperature to said flush section.

5. In a continuous flow commercial laundry having a flush section, a wash section, a rinse section, and an extractor section, the improvement comprising:
   a. means for collecting and combining water outflow from said flush and wash sections and directing said combined outflows through a first heat exchanger;
   b. means for collecting and combining water outflow from said rinse and extractor sections and directing a portion of said combined outflows through a second heat exchanger;
   c. means for supplying fresh water to be heated to said first and second heat exchangers and for directing heated fresh water from said heat exchangers to said rinse section.

6. The combination set forth in claim 5 including proportioning means connected to directly receive a portion of the combined water outflow from said rinse and extractor sections, and to receive another portion of said combined outflow after it passes through said second heat exchanger, said proportioning means combining said portions to provide water at a predetermined temperature to said flush section.

7. A method for recovering heat in a continuous flow commercial laundry having a flush section, a wash section, a rinse section, and an extractor section, comprising the steps:
   a. extracting and combining waste water from said flush and wash sections and passing said waste water through a first heat exchanger;
   b. extracting and combining outflow water from said rinse and extractor sections and passing said outflow water through a second heat exchanger;
   c. passing fresh water through said first heat exchanger in heat exchange relation with said waste water;
   d. passing fresh water through said second heat exchanger in heat exchange relation with said outflow water;
   e. mixing fresh water flowing from said first and second heat exchangers and directing the mixed fresh water to said rinse section.

8. The method of claim 7 including the step of combining a portion of the outflow water from said rinse and extractor sections with a portion of the water exiting said second heat exchanger, and directing said combined portions to said flush section.

9. The method of claim 7 including the further step of passing said mixed fresh water through a third heat exchanger in heat exchange relation with said outflow water prior to directing said mixed fresh water to said rinse section.

* * * * *